United States Patent
Morihara et al.

(10) Patent No.: US 11,124,724 B2
(45) Date of Patent: Sep. 21, 2021

(54) METHOD FOR PRODUCING A WATER-RESISTANT, COMPRESSED BIOMASS PRODUCT

(71) Applicant: HM³ Energy, Inc., Gresham, OR (US)

(72) Inventors: Hiroshi Morihara, Gresham, OR (US); Howard J. Dawson, Anacortes, WA (US); William C. Breneman, Moses Lake, WA (US); Mary McSwain, Gresham, OR (US)

(73) Assignee: HM3 Energy, Inc., Gresham, OR (US)

( * ) Notice: Subject to any disclaimer, the term of this patent is extended or adjusted under 35 U.S.C. 154(b) by 0 days.

(21) Appl. No.: 16/704,959

(22) Filed: Dec. 5, 2019

(65) Prior Publication Data

US 2020/0181516 A1   Jun. 11, 2020

Related U.S. Application Data

(60) Provisional application No. 62/775,601, filed on Dec. 5, 2018.

(51) Int. Cl.
| | | |
|---|---|---|
| *C10L 5/44* | (2006.01) | |
| *C10L 5/08* | (2006.01) | |
| *C10L 5/36* | (2006.01) | |

(52) U.S. Cl.
CPC ............... *C10L 5/442* (2013.01); *C10L 5/08* (2013.01); *C10L 5/361* (2013.01); *C10L 2200/0469* (2013.01); *C10L 2290/06* (2013.01); *C10L 2290/146* (2013.01); *C10L 2290/28* (2013.01); *C10L 2290/30* (2013.01)

(58) Field of Classification Search
CPC ......... C10L 2200/0469; C10L 2250/06; C10L 2290/06; C10L 2290/146; C10L 2290/30; C10L 5/08; C10L 5/361; C10L 5/442; C10L 9/083; C12N 2770/32034; C12N 2770/32134
See application file for complete search history.

(56) References Cited

U.S. PATENT DOCUMENTS

| | | |
|---|---|---|
| 2,679,316 A | 3/1950 | Ruepp |
| 3,018,227 A | 1/1962 | Baum et al. |
| 3,177,821 A | 4/1965 | Harrington |
| 3,354,844 A | 11/1967 | Roll et al. |
| 4,007,093 A | 2/1977 | Doilov et al. |
| 4,057,398 A | 11/1977 | Bennett et al. |
| 4,372,227 A | 2/1983 | Mahoney et al. |
| 4,486,300 A | 12/1984 | Prieb |
| 4,553,978 A | 11/1985 | Yvan |
| 4,787,917 A | 11/1988 | Leclerc de Bussy |
| 4,816,592 A | 3/1989 | Bourgeois |
| 4,915,824 A | 4/1990 | Surtees |
| 4,954,620 A | 9/1990 | Bourgeois |
| 5,584,970 A | 12/1996 | Schmalfeld et al. |
| 5,829,597 A | 11/1998 | Bielagus |
| 5,894,806 A | 4/1999 | Smyrniotis et al. |
| 9,206,368 B2 | 12/2015 | Breneman et al. |
| 9,487,721 B2 | 11/2016 | Breneman et al. |
| 9,719,040 B2 | 8/2017 | Morihara et al. |
| 2003/0221363 A1 | 12/2003 | Reed |
| 2008/0223269 A1 | 9/2008 | Paoluccio |
| 2008/0271657 A1 | 11/2008 | Cross |
| 2009/0178599 A1 | 7/2009 | Pastore et al. |
| 2010/0092365 A1 | 4/2010 | Shipley |
| 2010/0101141 A1 | 4/2010 | Shulenberger et al. |
| 2010/0192867 A1 | 8/2010 | Gauthier et al. |
| 2010/0242351 A1 | 9/2010 | Causer |
| 2010/0258429 A1 | 10/2010 | Ugolin |
| 2010/0281759 A1 | 11/2010 | Yanik et al. |
| 2010/0287826 A1 | 11/2010 | Hoffman et al. |
| 2010/0304440 A1 | 12/2010 | Medoff |
| 2011/0116986 A1 | 5/2011 | Balint et al. |
| 2012/0023813 A1 | 2/2012 | Sethi et al. |
| 2012/0073159 A1 | 3/2012 | Weisselberg et al. |
| 2012/0085023 A1 | 4/2012 | Teal et al. |
| 2012/0110896 A1 | 5/2012 | Coronella et al. |
| 2015/0307798 A1* | 10/2015 | Morihara ............ C10L 5/36 44/530 |
| 2015/0315502 A1 | 11/2015 | Foody |
| 2016/0002554 A1 | 1/2016 | Tumuluru |
| 2016/0152911 A1 | 6/2016 | Wiren et al. |

FOREIGN PATENT DOCUMENTS

| | | |
|---|---|---|
| DE | 10 2010 045 612 | 3/2012 |
| EP | 2 154 227 | 2/2010 |
| GB | 2 448 531 | 10/2008 |
| WO | WO 2009/143017 | 11/2009 |
| WO | WO 2010/089342 | 8/2010 |
| WO | WO 2010/093310 | 8/2010 |
| WO | WO 2011/135305 | 11/2011 |
| WO | WO 2012/074374 | 6/2012 |
| WO | WO 2012/134907 | 10/2012 |
| WO | WO 2012/145397 | 10/2012 |
| WO | WO 2012/106801 | 8/2015 |
| WO | WO 2018/071848 | 4/2018 |

OTHER PUBLICATIONS

Bergman, "Combined torrefaction and pelletisation. The TOP process," *Energy Research Centre of the Netherlands*, pp. 1-29, Jul. 2005.

Bergman et al., "Torrefaction for biomass upgrading," published at the 14th European Biomass Conference & Exhibition, Paris, France, Oct. 17-21, 2005 (7 pages).

Ghiasi et al., "Densified biocoal from woodchips: Is it better to do torrefaction before or after densification," *Applied Energy* 134:133-142, 2014.

International Search Report dated Jun. 20, 2012 from International Application No. PCT/US2012/029890.

(Continued)

*Primary Examiner* — Latosha Hines
(74) *Attorney, Agent, or Firm* — Klarquist Sparkman, LLP

(57) ABSTRACT

A method is disclosed for producing a mechanically stable, energy dense and water-resistant biomass product. By utilizing a unique two-step heating process in combination with mechanical compression, the resulting biomass product retains its physical shape and strength after immersion in ambient water for many hours. The treatment is effective for a variety of cellulosic biomass materials including forest slash wood.

7 Claims, No Drawings

(56) References Cited

OTHER PUBLICATIONS

International Search Report dated Jul. 17, 2012 from International Application No. PCT/US2012/034076.
International Search Report dated May 2, 2014 from International Application No. PCT/US2013/072486.
International Search Report dated Jan. 19, 2018 from International Application No. PCT/US2017/056637.
Reza et al. "Pelletization of biochar from hydrothermally carbonized wood," *Environmental Progress & Sustainable Energy*, 31(2):225-235, Jul. 29, 2012.
Sampson et al., "Logistics of Agricultural-Based Biomass Feedstock for Saskatchewan," Research Report, Project No. E7810, pp. 1-238, May 10, 2012.

\* cited by examiner

METHOD FOR PRODUCING A WATER-RESISTANT, COMPRESSED BIOMASS PRODUCT

CROSS REFERENCE TO RELATED APPLICATION

This application claims the benefit of the earlier filing date of U.S. provisional patent application No. 62/775,601, filed Dec. 5, 2018, which is incorporated herein by reference in its entirety.

BACKGROUND

Woody biomass has been used for centuries to provide heat for personal comfort, cooking, and power generation, such as by boiling water to produce steam at elevated pressure. Unfortunately, when raw wood burns it produces partially combusted tars which, are air pollutants, and can foul heat transfer surfaces too. Converting raw wood to charcoal resolves many of these issues, but also reduces the net effective amount of energy of the woody material.

Torrefaction, a process which roasts the woody material in a low oxygen environment, has been practiced since the latter part of the 19$^{th}$ century and in large scale during the second World War ("*Torrefaction—A New Process In Biomass and Biofuels*". *New Energy and Fuel*. Nov. 19, 2008). While the basic process has been practiced at full commercial scale, and most recently as a coal replacement fuel for use in coal-fired, electric power generation plants, the technology is still developing to resolve two of the important issues which limit its full potential. To be economical, the biomass product must be highly water resistant and the product must have a high volumetric energy density. Torrefaction renders the biomass resistant to water, but also reduces the capability to be densified to a mechanically stable form. Raw biomass can be densified to a strong stable form, but is intolerant to moisture, which completely breaks down the compressed form. Binder additives have been proposed to address this particular problem. But, binders that are added to promote mechanical stability are cost prohibitive. To address these deficiencies, a process was developed to torrefy woody biomass (U.S. Pat. No. 9,206,368, incorporated herein by reference) and to then densify the torrefied biomass using water to promote densification in a modified bricketting machine (U.S. Pat. No. 9,719,040, incorporated herein by reference). However, while the resulting products were substantially improved, they were still not adequately hydrophobic.

SUMMARY

It has now been discovered that after compressive densification of biomass, such as torrefied biomass, while there was a small amount of residual moisture present, subjecting the torrefied and densified biomass to a subsequent additional heat treatment at an effective elevated temperature for an effective period of time produced a mechanically stable product that was also highly resistant to moisture. For example, certain embodiments concern subjecting a torrefied and densified biomass to a temperature greater than room temperature and up to 230° C., and more typically from 120° C. to 230° C., for an effective period of time, such as from 5 minutes up to at least 60 minutes.

Certain more particular embodiments concern sizing and optionally milling torrefied biomass to provide particulate matter. Sizing and optionally milling the torrefied biomass can comprise providing particulate matter having a reduced particle size with an exemplary average particle size of 0.1-5 mm. The moisture content of the particulate matter may be adjusted by adding water to provide a humidified biomass, such as a biomass having an average moisture content of from 5%-15% by weight based on total mass of the torrefied biomass and water present. The temperature of the humidified biomass is adjusted to have an average bulk temperature of greater than 80° C., such as a temperature of from 80° C. to 140° C. The humidified, finely ground torrefied biomass is compressed to a provide a compressed biomass, and the compressed biomass is reheated to an effective temperature for an effective period of time. The reheating temperature typically is greater than 120° C., such as a temperature of between 120° C. and 230° C. The effective time period typically is at least 5 minutes, and generally is from 5 minutes to 60 minutes.

Certain disclosed embodiments concern a process for conditioning torrefied biomass to render it suitable for manufacturing water resistant, mechanically-stable briquettes or pellets. The method may comprise sizing and optionally milling torrefied biomass to provide particulate matter, having a reduced particle size, such as an average particle size of 0.1-5 mm. The moisture content of the particulate matter is adjusted by adding water sufficient to provide a humidified biomass having an increased moisture content, such as an average moisture content of from 5%-15% by weight based on total mass of the torrefied biomass and water present. The temperature of the humidified biomass is adjusted to have an average bulk temperature of greater than 80° C. to 140° C. The humidified, finely ground torrefied biomass is compressed to a provide a compressed biomass having a density of 1.0-1.4 grams/cm$^3$. The compressed biomass is reheated to a temperature of between 120° C. and 230° C. for a time period of from about 5 to about 60 minutes. The biomass is then allowed to cool to ambient temperature.

Biomass treated in this manner can be formed into desired end products, such as fuel briquettes. For conditioned biomass suitable for manufacturing fuel briquettes, the torrefied biomass typically comprises 5 wt % or less of particles having an average size/aspect ratio of less than 1 mm and 5 wt % or less of particles having a particle size greater than 300 mm, a bulk moisture content of less than 15 wt %, an energy density of at least 5,000 kcal·kg (dry basis), and a Hargrove Grindability Index of between 40 and 70. Fuel briquettes made by the process according typically have a particle density of 1.0-1.4 grams/cm$^3$, a Hargrove Grindability Index of between 40 and 70, a moisture content of less than 10 wt %, and sufficient strength after immersion in water for 24 hours to withstand a drop onto a hard surface from 6 feet with less than 10 wt % loss to breakage, generally less than 5 wt % loss to breakage, such as from 1 wt % to 2 wt % loss to breakage.

DETAILED DESCRIPTION

I. Terms

The following explanations of terms and abbreviations are provided to better describe the disclosed embodiments and to guide those of ordinary skill in the art to practice the invention.

As used herein, "comprising" means "including" and the singular forms "a" or "an" or "the" include plural references unless the context clearly dictates otherwise. The term "or"

refers to a single element of stated alternative elements or a combination of two or more elements, unless the context clearly indicates otherwise.

Unless explained otherwise, all technical and scientific terms used herein have the same meaning as commonly understood by one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

The disclosure of numerical ranges refers to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art or as disclosed herein. When directly and explicitly distinguishing embodiments from discussed prior art, the embodiment numbers are not approximates unless the word "about" is recited.

Biomass refers to various kinds of cellulose-containing materials and in the context of this present disclosure means, by way of example and without limitation, forest waste, agricultural crops either grown specifically for energy production or as by-products of traditional agricultural activities, or cellulosic biomass from urban origin. Biomass may be obtained from forest thinning operations, as non-commercial "slash" from commercial logging operations or from purposeful agricultural operations, which encourage fast growing cellulosic species, such as switch grass, corn stover, *Arundo donax*. These exemplary biomass materials have a wide range of as-harvested physical size and shape, and a highly variable amount of moisture.

II. Disclosed Embodiments

A. Torrefaction

The general process for converting biomass to torrefied product is known, and certain particular torrefaction systems and methods are disclosed by U.S. Pat. Nos. 9,206,368 and 9,719,040. Feedstock biomass contains a substantial and highly variable amount of moisture, either as free water or bound water. The biomass is also generally highly variable in the physical size of the individual pieces. Based on these attributes, torrefaction systems may be configured to specifically process feedstocks of wide variation in physical size, shape, and/or composition.

Uniform and controlled biomass torrefaction is desirable. Incomplete torrefaction results in a product which will be problematic in grinder operations due to a higher modulus (flexibility and toughness). Over-torrefied material loses more of its energy as the high fuel value compounds are driven off at long residence time or higher temperatures.

A mass flow vessel design can be designed to accommodate a reasonably allowable variation in feed stock attributes. Simple grinding and sizing methods can economically achieve a sufficiently uniform size for the feedstock that allows a bulk flow hopper to be designed. Furthermore, controlling the torrefaction process is facilitated by separating the high energy and time-dependent drying portion of the process from the high temperature, shorter residence time torrefaction portion of the process. The ability to separate these two process steps facilitates for certain embodiments a greater degree of control and hence production of a more consistent torrefied product.

The torrefaction process subjects raw particulate biomass to an elevated temperature sufficient to induce biomass torrefaction. For certain embodiments, particulate biomass may be introduced into a torrefaction reactor, such as a reactor having mass flow characteristics as described in U.S. Pat. No. 9,206,368. Such reactors may be equipped with a heated gas input; a gas discharge output; a particulate solids inlet; and a particulate solids discharge.

It may be desirable to pretreat raw particulate biomass prior to charging to a torrefaction reactor. For example, raw particulate biomass may be pretreated to mitigate some of the variance of the natural feed material. For certain embodiments, a biomass feed is first converted to a specified size in a conventional grinder. The raw biomass may have individual pieces up to 75 mm in diameter and 300 mm or more in length. The grinder reduces this size to a maximum of 13 mm×75 mm. Any conventional grinder may be used, such as a horizontal tub grinder commonly used in the forest products industry. The size control operation may be physically remote from the remainder of the process, such as in the harvest field.

The sized biomass, containing up to about 50% moisture, may be dried in a continuous direct air heated dryer, such as a bulk flow type or any dryer suitably configured for this service. The dryer delivers a product having a controlled residual moisture content, such as a moisture content of 25 wt % or less based on total weight of the biomass. Advantageously the residual moisture content is from about 12 wt % to about 25 wt %. The heated air for the dryer may be a combination of hot combustion gases from an auxiliary heater combined with cooled combustion gases from a thermal oxidizer associated with the torrefaction reactor. Fuel combined with combustion air in the auxiliary heater provides the balance of thermal energy for operating the dryer. The dryer delivers a product having a controlled residual moisture content, such as a moisture content of 25 wt % or less, to the torrefier.

From the dryer, biomass having 25% or less moisture content and with a size of from about 13 mm to about 75 mm in the longest dimension is fed to a bulk flow torrefier. The biomass enters the torrefier at the top via a rotary air lock or similar atmosphere control device to prevent ingress of oxygen into the reactor as torrefaction of biomass occurs at elevated temperatures in the substantial absence of oxygen. The volume of the reaction zone of the vessel allows the biomass to be heated to a suitable torrefaction temperature, such as a temperature of from 240° C. to 280° C. Controlling charging and discharging rates provides a residence time at the maximum temperature of from about 5 minutes to about 15 minutes. Exposure to temperatures greater than this promotes pyrolysis of the biomass and reduces the calorific value of the torrefied biomass. If the residency time is too short the raw biomass does not undergo full conversion to a torrefied biomass.

Decomposition of the biomass and removal of the last amount of moisture and torrefaction reaction gases occurs as hot gases move upward in the reactor. This method permits the maximum temperature of the torrefied biomass to be limited by modulating the temperature of the torrefying gases circulated through the bulk flow reactor.

Torrefied biomass is cooled to a temperature below the torrefaction temperature, such as by contact with a jacketed section in the torrefier. The coolant in this area may be water or a heat transfer fluid. The temperature of the coolant is maintained above the dew point of the hot gases in the torrefier, generally above 80° C. The downward moving mass is therefore cooled to below 150° C., its auto-ignition temperature in air.

Cooled and torrefied biomass is discharged from a lower conical section of the torrefier via an opening to a rotary air lock, or preferably a graduated pitch screw conveyor. The discharge opening may be an elongated slot whose smallest dimensions have been previously determined by a series of tests using the typical process biomass. For Eastern Oregon Juniper shredded and sized to 13 mm×75 mm as the longest dimension, the minimum dimension of the elongated discharge opening to provide for a bulk flow condition is 200 mm. The torrefied biomass as discharged may still have a temperature significantly greater than the ambient air temperature; accordingly, it is desirable to manage this temperature by advantageously subjecting it to a cooling step to mitigate any risk of spontaneous combustion on exposure to ambient air.

This method permits the properties of the torrefied biomass to be controlled by modulating the rate of withdrawal of the torrefied biomass from a bulk flow torrefier. A useful discharge means is a screw conveyor in which the flights of the conveyor increase in the direction of the discharge flow in order to facilitate bulk flow from the reactor.

The cooled torrefied product from the reactor is optionally milled to a smaller size suitable for densification. The milled and torrefied product is then densified to yield a torrefied, high density fuel.

B. Binder Free, Compacted Torrefied Biomass

Certain disclosed embodiments further comprise compacting the torrefied biomass. For example, the method may further comprise: milling uncompacted, torrefied biomass to have a smaller average particle size, such as a particle size of about 0.1 mm to less than about 10 mm, such as 0.1 mm to 5 mm; sieving the uncompacted torrefied biomass; conditioning the uncompacted torrefied biomass to increase its moisture content to about 5% to about 15%; compacting the uncompacted torrefied biomass in a compaction device without using an extrinsic binder additive; and curing the compacted torrefied biomass in a post-compaction device to produce compacted torrefied biomass having an average mass density of at least about 1.1 $g/cm^3$ to about 1.3 $g/cm^3$. The method can comprise using a compaction device comprising at least one die modified to comprise an opening defining an inlet and an outlet. The inlet can be configured to have a temperature of from about 80° C. to about 140° C. The outlet can be configured to have a temperature of from about 120° C. to about 140° C. In some embodiments, the compaction device is operated to provide residence time of the biomass as it passes through the die modified to comprise the opening with the residence time ranging from about 5 seconds to about 15 seconds. The compaction device can be operated to provide a compression ratio of at least 3:1, such as 4:1, 5:1, 6:1, or 7:1.

In certain embodiments of the method, the compaction device is a cuber. In embodiments using a cuber, the cuber can be fitted with at least one die that is modified to comprise an opening defining an inlet having a temperature ranging from about 80° C. to 140° C., and an outlet having a temperature ranging from about 120° C. to about 140° C. The cuber can be operated to provide a biomass residence time ranging from about 5 seconds to about 15 seconds as it passes through the die modified to comprise the opening.

C. Heat Treating Biomass

Compressed woody biomasses, such as can obtained by pelletizing sawdust, wood chips, torrefied wood chips or straw, and the like, are not naturally water resistant. When immersed in water these untreated product forms rapidly disintegrate into an uncompressed state. However, if these compressed woody biomass forms are subjected to an elevated effective temperature for an effective period of time a product is formed that is highly resistant to water. Without being limited to a particular theory, it currently is believed that when biomass is processed according to the present embodiments, the residual hemicelluloses, extractives and their decomposition products react with the lignin component in the biomass to form a condensation product. This makes the biomass highly resistant to water and sufficiently mechanically stable to resist break down during normal handling.

For certain disclosed embodiments, rather than performing torrefaction in a single step where the cellulosic biomass is reacted at an elevated temperature, followed by densification, the improved process provides for a second thermal treatment after densification where residual reactive sites within the torrefied material are further reacted to form a stable, water resistant product. This improved process has further advantages as will be described.

Ideally, the compressed woody biomass has a moisture content of between about 1 and 10% prior to post densification heating. The effective temperature of the post densification treatment typically is greater than room temperature to 230° C., and more typically is from 120° C. to 230° C. The duration of the elevated temperature period typically is at least 5 minutes and may be for an extended period of time but not too long to damage the biomass, and typically is less than 60 minutes. The treatment may be performed at atmospheric pressure or at any pressure less than the vapor pressure of water at the chosen temperature. After the thermal treatment, the treated material is cooled to ambient and packaged for storage or shipment.

After the post densification heat treatment, immersion of the treated form in ambient temperature water for many hours, even many days, did not cause the compressed woody biomass form to lose its structural integrity nor disintegrate. Depending upon the densification process and source of biomass, the moisture uptake upon exposure may be up to 20%, which can be easily reduced by mild thermal exposure to dry air. This post-formation heat treatment, which can be conducted in an energy efficient process, offers an economical process for producing a structurally stable product which can be readily transported and/or stored.

III. Economic Advantage

Compressed woody biomass, commonly called "white wood pellets," is finding increased use as a fuel source in steam-powered, electrical generator power plants. White wood pellets have also been used as a fuel source for early automotive power generation and in-home heating stoves. For example, Volkswagen passenger sedans of the mid-1940s operated by gasification of white wood pellets to produce a combustible vapor fuel. But white wood pellets are troublesome to store and transport due to their characteristic hydrophilic character, which results in the compressed forms losing virtually all of their structural integrity over time and reverting back to their initial small particle size. By making the white wood pellets stable to water exposure, storage areas need not be covered, conveyors need not be covered and cargo ships can transport the material without fear of their cargo becoming "mushy".

Currently there are two process pathways for preparing woody biomass for commercial use. The predominant method is to first dry the raw biomass to a suitable low moisture content of less than about 20%. The raw biomass is then chopped or ground to a small particle size of less than about 1 mm. Because of the high modulus of the white wood material, grinding to the required small size consumes a significantly large amount of energy. The ground, dried biomass is then compressed to form "pellets". These pellets, which may be from about 5 mm up to about 100 mm in diameter and from about 10 mm to 300 mm in length, is the final product. Most economically, the formation of the pellets is accomplished without the addition of a binder. However, these white pellets have fairly low structural strength, even when a binder, such as a lignin-based fluid, wax or high molecular weight organic fluid, is added to the dried, ground feed stock in order to produce a final product which has sufficient strength to survive the rigors of storage and transport. However, binders add significantly to the cost of the product. And binders do little to impart any water-resistant quality to the product.

Torrefied woody biomass may be used instead of un-torrefied white wood as the raw material. Torrefied woody biomass has already been dehydrated as part of the torrefaction process. The torrefaction thermal process essentially increases the energy density of the biomass by removing the water and low molecular weight and low energy content alcohols while leaving the residual biomass substantially dimensionally unchanged [(Felfli, Wood briquette torrefaction. *Energy for Sustainable Development, Volume IX*(3), pp. 19-22 (2005)]. In torrefaction processes, raw biomass which has been milled and screened to a size specific to the chosen process is exposed to a temperature of between 180° C. and 280° C. for a time of between 5 and 60 minutes in a basically oxygen lean process. Residual moisture, alcohols, acetic acid and volatile organic compounds are evaporated from the biomass. This increases the fuel energy concentration in the torrefied product by removing low energy components.

Torrefaction renders the biomass much more brittle than the raw material. Torrefied biomass is therefore more easily ground to the small size required in the densification process. Generally, the grinding energy required is less than 30% of that required for white wood [Williams et al., 10$^{th}$ European Conference on Coal Research and its Applications Bond Index & Hargrove Grindability Index Tests for Biomass & Coal (2014)]. As part of the generalized torrefaction process, much of the moisture and lignin-reactive compounds are removed, which makes forming structurally sound pellets more difficult than when using white wood. Compressed torrefied biomass can be formed into mechanically sound pellets or similar forms without using an extrinsic binder (U.S. Pat. No. 9,719,040, incorporated herein by reference). Adding an extrinsic binder increases the cost of the product without benefiting the product's end use as a fuel. Torrefied biomass pellets are preferred relative to white wood pellets as a fuel due to the increased energy density that results from the absence of low energy density volatile compounds lost during torrefaction thermal treatment of the biomass.

Nevertheless, unless torrefaction conditions are well controlled, even densified torrefied biomass may not be stable when exposed to water. Improper torrefaction will not necessarily result in torrefied biomass pellets that remain as a stable product form upon exposure to water for several hours. Careful control of torrefaction temperature is important to assure that sufficient moisture or lignin-reactive species remain so that densification can be accomplished (See, U.S. Pat. No. 9,206,368, which is incorporated herein in its entirety by reference).

Hydrolytic stability is important for transportation and storage purposes. Water-induced product degradation during exposed transportation makes handling the material extremely difficult as the unexpectedly "mushy" wet biomass will not flow as easily as hard pellets. Covered storage is more expensive than uncovered open storage. And added water adsorption dramatically decreases the thermal value of the fuel.

The presently disclosed thermal treatment after pelletizing white wood biomass or torrefied woody biomass adds expense to the overall process. However, this cost increase is modest compared to the extra costs associated with maintaining a dry environment during storage and shipment.

Thus, the economical choice between white wood pellets and torrefied wood pellets is based on the relatively higher costs of grinding the white wood raw material, costs associated with using an extrinsic binder and the higher volumetric energy efficiency of the torrefied pellets. And finally, the heat-treated product, whether in pellet or cube form from either white wood or torrefied biomass, is more easily ground to the fine powder required for efficient combustion in fired furnaces or boilers. Applicant's disclosed embodiments reduce production costs in the two substantially different processes.

In the case of the white wood pellets, the substantial capital investment and processing knowledge which has been developed over the many years is retained. The addition of the post-densification step described herein offers a low-cost process for producing a stable and easily transported product.

For torrefied pellets, the careful process control needed to manage residual moisture in the compressed torrefied product is eliminated and replaced by a more process stable environment. The energy density of the compressed stable pellets from either process, along with the production of any combustion by-products, is substantially unchanged from those of the original product form.

A further advantage of post formation curing of white wood pellets or densified torrefied wood chips is that the materials are easier to grind into a fine powder, which is necessary when the materials are used as fuel in powder-fed combustion units. Ideally, the treated pellets would have a Hargrove Grindability Index (HGI) [See, Hardgrove, R. M. (1932). Grindability of Coal. *ASME Transactions*, pp. 37-46 (1932), which is incorporated herein by reference] of 45-70, with the higher values corresponding to a more brittle material. White wood pellets, which have not had a final thermal treatment, typically have HGIs of about 20. This "softness" can be troublesome in commercial units as the material can smear and foul the grinding surfaces. The torrefied forms have a HGI on the order of 50.

IV. Examples

The following examples are provided to illustrate certain features of disclosed embodiments. A person of ordinary skill in the art will appreciate that the scope of the invention is not limited to these features.

Example 1

This example concerns heat treating torrefied cubes of wood raw material. Torrefied 1 inch×1 inch×1 inch cubes were placed in a 200° C. oven for 30 minutes. The heat-treated cubes were then allowed to cool to room temperature. Several heat-treated cubes were placed in water for 16 hours at room temperature. The cubes retained their original shape and strength.

Example 2

This example a concerns heat treating white wood pellets. 0.25-inch diameter by 0.75-inch-long white wood pellets were heated in an oven at 215 C for 30 minutes. The heat-treated pellets were then allowed to cool to room temperature. Heat-treated pellets were then immersed in room temperature water for 16 hours. The pellets retained their original shape.

Example 3

White wood pellets were immersed in water at room temperature for 30 minutes. The pellets had lost their original shape and had disintegrated to the particle size from which they were initially compressed.

Example 4

A HIX belt driven heater was used to thermally treat compressed woody biomass. In the HIX heater hot air is continuously circulated around compressed woody biomass as it passes through the oven at a controlled rate.

Torrefied 1-inch juniper cubes were heated to 190° C., 200° C., or 210° C. for 30 minutes. After cooling to ambient temperature, the cubes were immersed in water for 24 hours and the weight gain was measured. The weight gain for all samples was at most 20%. Furthermore, the cubes retained their shape and stayed hard. One cube was dropped onto a concrete floor from a height of 6 feet. Only some sharp edges of the cube were broken off, corresponding to a nominal 1 to 2% breakage by weight.

This example was also repeated at the same conditions with raw 8 mm diameter pellets with similar results.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

The invention claimed is:

1. A process for conditioning torrefied biomass to render it suitable for manufacture of water resistant, mechanically stable briquettes or pellets, comprising:

sizing and optionally milling torrefied biomass to provide particulate matter having an average particle size of 0.1-5 mm;

adjusting the moisture content of the particulate matter by adding water sufficient to provide a humidified biomass having an average moisture content of from 5% 15% by weight based on total mass of the torrefied biomass and water present;

adjusting temperature of the humidified biomass to have an average bulk temperature of greater than 80° C. to 140° C.;

compressing the humidified, finely ground torrefied biomass to a provide a compressed biomass having a density of 1.0-1.4 grams/cm$^3$;

re-heating the compressed biomass to a temperature of between 120° C. and 230° C. for a time period of from about 30 minutes to about 60 minutes; and cooling the biomass to ambient temperature.

2. The process according to claim 1 further comprising forming fuel briquettes.

3. The method according to claim 1 for producing a conditioned biomass suitable for manufacturing fuel briquettes, wherein the torrefied biomass comprises:

5 wt % or less of particles having an average size/aspect ratio of less than 1 mm and 5 wt or less of particles having a particle size greater than 300 mm;

a bulk moisture content of less than 15 wt %;

an energy density of at least 5,000 kcal·kg (dry basis); and a Hargrove Grindability Index of between 40 and 70.

4. The method according to claim 2 for manufacturing fuel briquettes by compression molding conditioned torrefied biomass followed by a thermal treatment, wherein the conditioned compressed biomass has an average particle size of up to about 30 mm; an average moisture content of less than 10 wt %; is stable upon immersion in water for at least 24 hours; and has an equilibrium moisture content of less than 25 wt % after twenty four hour emersion in water.

5. The method of claim 1 wherein the product does not include an extrinsic binder.

6. A conditioned torrefied biomass product produced by the method of claim 1.

7. A fuel briquette made by the process according to claim 4 wherein the fuel briquette has a particle density of 1.0-1.4 grams/cm$^3$, a Hargrove Grindability Index of between 40 and 70, a moisture content of less than 10 wt %, and sufficient strength after immersion in water for 24 hours to withstand a drop onto a hard surface from 6 feet with less than 10 wt % loss to breakage.

* * * * *